United States Patent Office

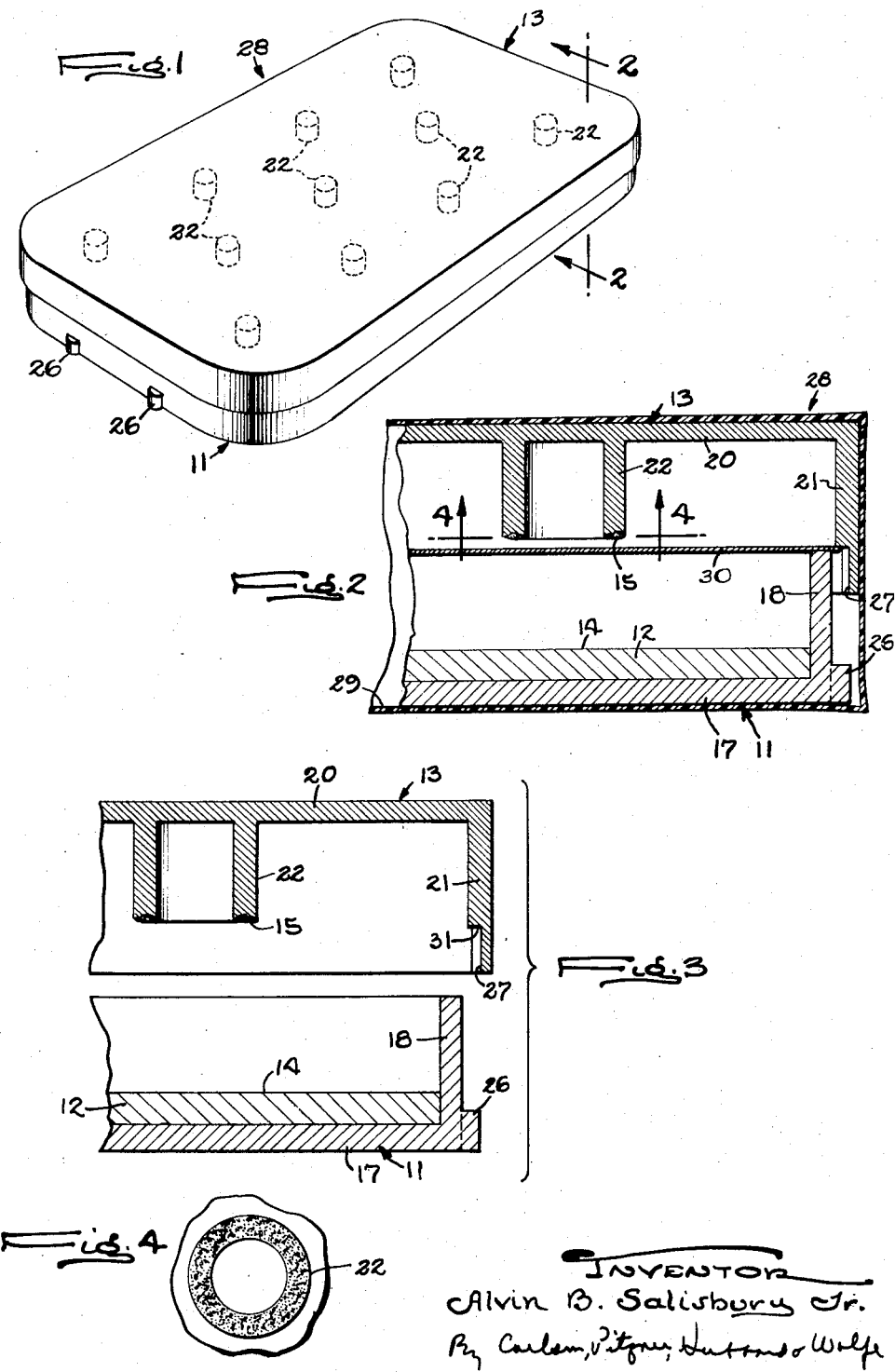

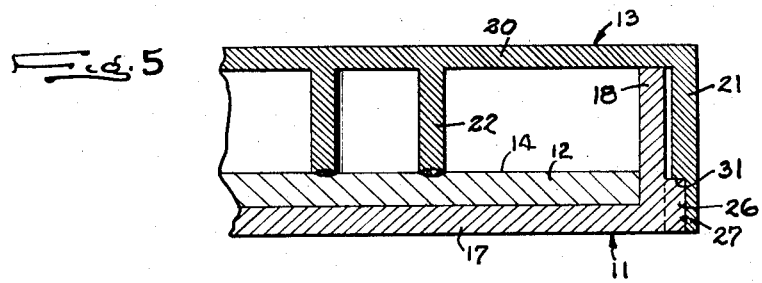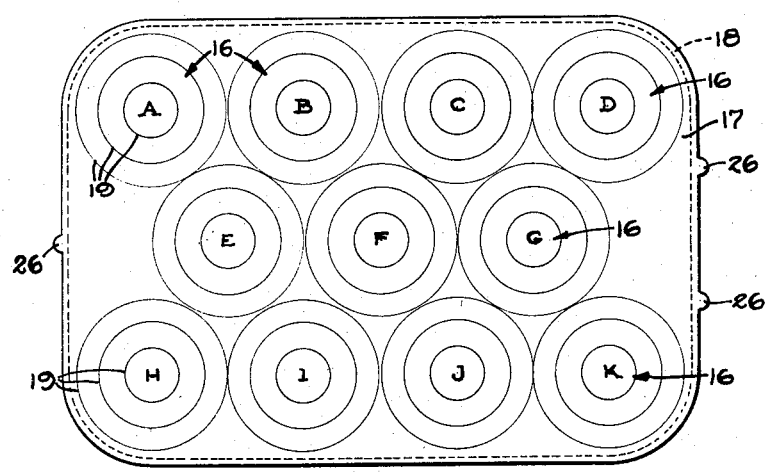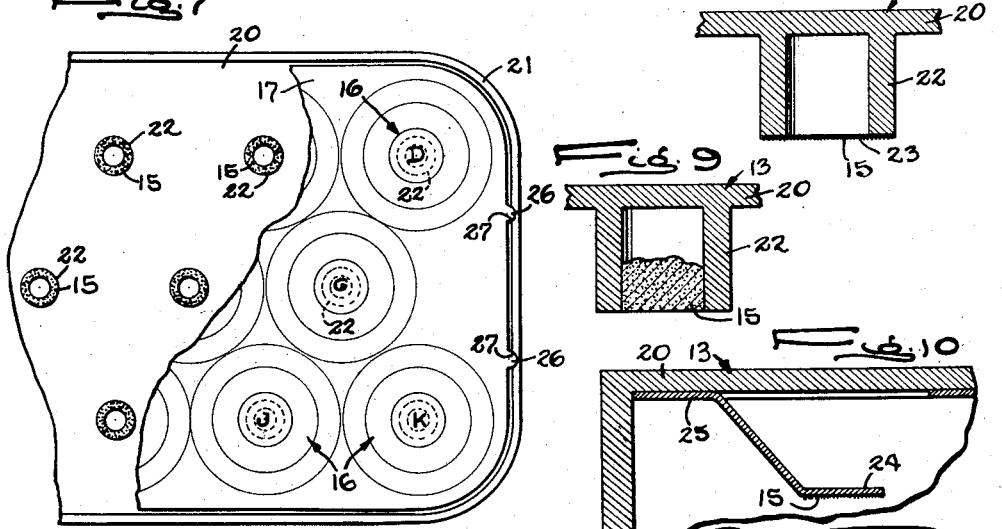

2,871,168
Patented Jan. 27, 1959

2,871,168

APPARATUS FOR TESTING METABOLIC AGENTS

Alvin B. Salisbury, Jr., Fairborn, Ohio, assignor to Ankh Laboratories, Inc., Fairborn, Ohio, a corporation of Ohio Application September 27, 1955, Serial No. 536,939

8 Claims. (Cl. 195—139)

This invention relates generally to apparatus for use in bacteriological culture studies and more particularly to apparatus in which the effects of different metabolic agents on bacteria are determined by observing the growth of bacteria in a nutrient culture medium after the agents have been brought into contact with a surface of the medium previously impregnated with the bacteria.

The general object of the invention is to provide novel culture study apparatus which simplifies and reduces the number of operations required to complete a bacteriological culture study of the above character, which is simple and inexpensive to manufacture, and which may be utilized for complete culture studies without additional or special laboratory equipment.

Another object is to prepackage a plurality of different metabolic agents and the culture medium in a novel unit which may be disposed of economically after a single use.

A further object is to support the metabolic agents on the cover of a container for the culture medium in a novel manner to bring the agents into proper contacting relation with the medium as an incident to assembling the cover and the container.

The invention also resides in a novel construction of the container parts and arrangement of the metabolic agents on the cover to facilitate visual observation of the effects of the agents.

Other objects and advantages of the invention will become apparent from the following detailed description taken in connection with the accompanying drawings, in which Figure 1 is a perspective view of culture study apparatus embodying the novel features of the present invention, the parts being shown in their packaged relation prior to use.

Fig. 2 is an enlarged fragmentary sectional view taken along the line 2—2 of Fig. 1.

Fig. 3 is an exploded view similar to Fig. 2 showing the container parts prepared for assembly.

Fig. 4 is a fragmentary view taken along the line 4—4 of Fig. 2.

Fig. 5 is a view similar to Fig. 3 with the container parts assembled.

Fig. 6 is a bottom view of the container with the cover removed.

Fig. 7 is a fragmentary bottom view of the container with the cover assembled and the bottom partially broken away.

Figs. 8 and 9 are fragmentary views similar to Fig. 5 of modified forms of the invention.

Fig. 10 is a fragmentary sectional view showing a further modification.

The invention is shown in the drawings for purposes of illustration embodied in culture study apparatus comprising a shallow open top dish 11 adapted to contain a quantity 12 of nutrient culture medium such as blood agar and having a loose fitting cover 13. This apparatus is especially adapted for use in bacteriology culture studies to determine the effects of different metabolic agents on bacterial growth. In such studies an exposed surface 14 of the medium 12 is impregnated with bacterial organisms and quantities 15 of the different agents to be tested are brought into contact with spaced points of the impregnated surface, the spacing of the points of contact of the different agents being sufficient to avoid overlapping of the zones of effectiveness of the agents. A spacing of 3 centimeters between the centers of adjacent sets of zones has been found sufficient for this purpose.

After an incubation period which is of a length determined in accordance with known practice and during which the dish 11 is covered, the culture is observed visually. In the case of metabolic agents which are catabolic in character, for example, antibiotics such as chloramphenicol and oxytetracydine or chemotherapeutics such as sulfonamides, the effectiveness of each agent is exhibited as an absence of bacteria growth around the part of the medium surface contacted by the agent, the more effective the agent, the larger the area around the agent where the growth is inhibited. Where anabolic agents such as vitamins, proteins, and carbohydrates are used, the effectiveness of the agent is manifested as an increase of growth, the more effective agents having larger areas of growth around their points of contact with the medium.

In accordance with the present invention, the cover 13 and the dish 11 are constructed in a novel manner to simplify culture studies of the above character and enable the same to be conducted by unskilled personnel. To this end, the quantities 15 of the different metabolic agents to be used in the study are supported by the cover for contact with the exposed surface 14 of the medium 12 in the dish and are spaced apart on the cover in a predetermined pattern. Also, one of the cover and dish members includes means defining a plurality of sets 16 (Figs. 6 and 7) of concentric zones of effectiveness corresponding in number to the agents and arranged in a complementary pattern for registry of the centers of the different sets of zones with the respective agents on the cover when the latter is placed on the dish, the member with the zones having sufficient transparency for visual observation of the bacteria growth in each set of zones. To permit such observation even when the cover is removed, it is preferred to mark the zones on the dish as shown.

The dish 11 in this instance comprises a bottom plate 17 and a flange 18 upstanding around its periphery to contain the culture medium 12 which is a shallow layer covering the bottom plate. To enable a large number of agents 15 to be tested and thereby utilize the area of the exposed medium surface 14 efficiently, it is preferred to make the dish of oblong rectangular shape with the corners rounded to conform to the shape of the adjacent zones of effectiveness as shown in the drawings (Fig. 6). Herein, the dish is formed by molding a suitable thermoplastic resin such as clear polystyrene. The sets 16 of zones of effectiveness are circular and, in this instance, are defined by lines 19 scratched on the underside of the bottom plate by a suitable scribing tool after the molding operation.

To interfit with the dish 11, the cover 13 is of similar oblong rectangular shape with rounded corners. While it may fit inside of the dish flange 18 the cover in this instance comprises a flat plate 20 slightly larger than the bottom plate 17 so as to rest on the upper edge of the dish flange 18 and is formed with a depending flange 21 telescoping loosely with the dish flange on the outer side of the latter. The quantities 15 of the different metabolic agents are supported on the underside of the cover plate 20 with their downwardly facing surfaces spaced from the plate thereby insuring contact with the exposed medium surface. Herein, each agent is carried on the lower end of a support 22 projecting downwardly from the cover plate a substantial distance to enable the layer of culture medium to be thin and thereby reduce the quantity and the cost of the medium required.

In the preferred apparatus of Figs. 1 to 7, the construction of the supports 22 is simplified by molding the same as integral parts of the cover plate 20 which is formed of the same material as the dish 11. To facilitate such molding, the supports are shaped as hollow cylindrical tubes or pegs. The latter are arranged in a pattern complementary to that of the sets 16 of zones of effectiveness with four pegs 22 spaced along each side edge of the cover plate 20 and three along the longitudinal axis of the plate the same distances as the centers of the sets.

The quantities 15 of the different metabolic agents may be applied to the depending pegs in various ways such as by impregnating pieces 23 of absorbent paper with the agents and securing such pieces to the pegs by a suitable adhesive as shown in Fig. 8 or by filling the hollow lower end portion of each peg as shown in Fig. 9 with a quantity of the agent in powder form secured in the peg by suitable bonding material such as glycerin. It is preferred, however, to recess and roughen the ends of pegs as shown in Figs. 2 to 5 and fill such recesses with a mixture of a bonding material and the agent in powdered form. Such recessing may be effected by sandblasting the ends of the pegs, the roughened end of one peg being shown in Fig. 4 before application of the agent thereto.

In an alternative construction shown in Fig. 10, the agent supports 24 comprise partially cut-out flaps bent down from a separate stiff plate 25 of suitable material such as cardboard fitting against the underside of the cover plate 20 and within the cover flange 21. The flaps project downwardly far enough that the quantities 15 of metabolic agents carried by the lower ends of the flaps are in contact with the culture medium 12 the same as the agents on the pegs 22 of the preferred construction when the cover plate abuts the dish flange 18.

To reduce the possibilities of error in culture studies of the above character and to simplify such studies further, the cover 13 and the dish 11 are constructed in a novel manner permitting the cover to be fit onto the dish in only one predetermined position relative thereto. For this purpose, different numbers of lugs 26 project outwardly from opposite ends of the dish 11 adjacent the bottom thereof and corresponding numbers of recesses 27 are formed in the depending ends of the cover flange 21 to receive the lugs and permit the cover plate to rest on the dish flange 18 when the ends of the cover are oriented properly adjacent the corresponding dish ends as shown in Fig. 5. When the cover is reversed end for end relative to the dish, the lugs block downward movement of the cover and prevent movement of the same to its position of contact of the agents 15 with the culture medium 12.

The novel culture study apparatus described above is especially adapted for packaging as a self-contained unit 28 which may be disposed of economically after a single use and with which a complete culture study may be conducted without additional laboratory equipment. This unit comprises the dish 11 with the culture medium 12 in a layer on the bottom plate 12 and the cover 13 with the quantities 15 of different metabolic agents applied to the projecting ends of the pegs 22 and hermetically sealed from the medium within a hermetically sealed container 29 (Fig. 2). While the means 30 providing the hermetic seal between the medium and the agents within the container may take various forms, it is shown in this instance as comprising a thin sheet of metal foil (Fig. 2) covering the top opening of the dish and secured by suitable adhesive adjacent its periphery to the upper end of the dish flange 18. Preferably, the sealing sheet 30 extends outwardly beyond the dish flange for abutment with an outwardly facing shoulder 31 which is formed on the cover flange 21 by recessing the inner side thereof as shown in Fig. 2. The cover thus may be supported by the sealing sheet which maintains the agents separated hermetically from the culture medium 12 within the container 29. In this instance, the latter is a sealed flexible walled bag of a suitable thermoplastic resin such as polyethylene.

In assembling the disposable unit 28, first, the culture medium 12 is prepared under sterile conditions as a layer on the bottom plate 17 of the dish and, while such conditions are maintained, the sealing sheet 30 is placed on the upper end of the dish flange 18 as shown in Fig. 2. Next, the quantities 15 of agents are applied to the pegs 22 under sterile conditions and the cover is placed over the dish for abutment of the shoulders 31 with the peripheral edges of the sealing sheet 30. Finally, the dish with the cover thereon as shown in Fig. 2 is inserted in the container 29 and the latter is sealed shut.

To prepare the unit 28 for a culture study, the dish 11 is removed from the container 29, the sealing sheet is stripped from the dish flange 18, and the upper surface 14 of the culture medium 12 is impregnated with bacteria to be used in the culture. Then, the cover 13 is removed from the container 29 and is fit onto the dish 11 by telescoping the cover flange 21 over the dish flange 18 and bodily shifting the cover downwardly from the position shown in Fig. 3. If the cover is positioned properly end for end relative to the dish, the recesses 27 will receive the lugs 26 permitting the cover plate 20 to rest on the upper edge of the dish flange 18 with the metabolic agents 15 contacting the upper surface of the culture medium as shown in Fig. 5. If the cover is reversed end for end from the proper position, the lugs 26 abut the bottom of the cover flange and limit downward movement of the cover to a position in which the agents are spaced above and out of contact with the culture medium.

When the cover 13 and the dish 11 fit together properly in their predetermined assembled positions of Fig. 5, the pegs 22 and the agents 15 thereon register with the centers of the sets 16 of zones of effectiveness as shown in Fig. 7. By virtue of such registry, an unskilled technician can observe and readily compare the effects of the different agents on the bacteria growth. To enable the technician to identify quickly and easily the particular metabolic agent associated with and registering with each set 16 of zones of effectiveness, the set, in the prepackaged unit where the different agents to be used are predetermined, is marked with indicia individual to the particular agent. Such indicia may comprise the name or chemical symbol of the agent inscribed within the set of zones by a suitable scribing tool, the indicia in this instance being shown as capital letters A to K.

I claim as my invention:

1. In apparatus for testing the effect of different metabolic agents on bacterial organisms, the combination of, a dish having a layer of nutrient culture medium covering a flat bottom of the dish with its upper surface exposed, a cover for said dish adapted to interfit with the dish and overlie said layer, said cover having supporting means projecting into said dish and toward said exposed surface of said medium when the cover and the dish interfit with each other, a plurality of quantities of different metabolic agents in a solid state spaced apart on the underside of said cover and fastened to said supporting means for movement with the cover relative to said dish, said supporting means positioning said agents in contact with said medium surface when the cover interfits with the dish and overlies the surface, a hermetically sealed container enclosing said dish and said cover, and means within said container hermetically sealing said medium from said agents.

2. In apparatus for testing the effect of different metabolic agents on bacterial organisms, the combination of, a dish adapted to contain a quantity of nutrient culture medium and having a generally flat bottom plate with a flange upstanding around its periphery, a cover having a generally flat top plate of the same shape as said bottom plate and a flange depending from the periphery of the plate, said flanges telescoping with each other and said plates lying in spaced parallel planes when said cover and said dish are assembled, a plurality of supports spaced apart on and depending from the underside of said cover plate, a plurality of quantities of different metabolic agents in a solid state fastened to and movable with the lower end portions of said supports and spaced thereby from said cover plate for contact with the upper exposed surface of a layer of said medium on said dish bottom when the cover and the dish are assembled together, said flanges having projecitng and recessed portions permitting assembly of said cover and said dish in only one predetermined position and preventing assembly of the two in any other position, means on one of said plates defining a plurality of sets of zones of effectiveness registering with the different agents in said predetermined position of said cover on said dish, and indicia on one of said plates identifying each of said sets of zones with the registering one of said agents when said cover and said dish are in said predetermined position.

3. In apparatus for testing the effect of different metabolic agents on bacterial organisms, the combination of, an open top dish adapted to contain a quantity of nutrient culture medium arranged in a layer covering a generally flat bottom of the dish and having its upper surface exposed, a cover for said dish, said dish and cover having locating elements positioned to interfit with each other in only one predetermined position of the cover with respect to the dish and to block assembly of the cover in any other position on the dish, supporting means on said cover projecting into said dish and toward said exposed surface of said medium when the cover and the dish interfit with each other, a plurality of quantities of different metabolic agents in a solid state fastened to said supporting means for movement with said cover relative to said dish and spaced apart in a predetermined pattern on the underside of said cover, said supporting means positioning said agents in contact with said medium surface when said cover is in said predetermined position, means on said dish bottom defining sets of zones of effectiveness arranged in a pattern complementary to said agent pattern for registry of centers of the different sets with the respective agents, said bottom having sufficient transparency for visual observation of the growth of bacteria on said medium surface, and indicia on said dish bottom identifying each of said sets of zones with the registering one of said metabolic agents.

4. In apparatus for testing the effect of different metabolic agents on bacterial organisms, the combination of, a dish adapted to contain a quantity of nutrient culture medium and having a generally flat bottom plate with a flange upstanding around its periphery, a cover having a generally flat top plate of the same shape as said bottom plate and a flange depending from the periphery of the plate, said flanges telescoping with each other and said plates lying in spaced parallel planes when said cover and said dish are assembled, a plurality of supports spaced apart on and depending from the underside of said cover plate, and a plurality of quantities of different metabolic agents in a solid state fastened to and movable with said cover and supported on the lower end portions of said supports and spaced thereby from said cover plate for contact with the upper exposed surface of a layer of said medium on said dish bottom when the cover and the dish are assembled together.

5. In apparatus for testing the effect of different metabolic agents on bacterial organisms, the combination of, an open top dish adapted to contain a quantity of nutrient culture medium in the form of a layer covering a flat bottom plate of the dish, a cover comprising a flat plate and adapted to interfit with said dish with said plates lying in spaced generally parallel planes, said cover and said dish having locating elements permitting the cover and dish to interfit in only one predetermined position and blocking assembly of the cover in any other position on the dish, a plurality of supports spaced apart on said cover in a predetermined pattern and depending rigidly therefrom far enough to bring different metabolic agents on the lower ends of the supports into contact with a layer of said medium when the cover and said dish are interfit, means on said bottom defining a plurality of sets of concentric zones of effectiveness arranged in a pattern complementary to said support pattern for registry of the center of each set with the corresponding one of said supports when said cover and the dish interfit, said bottom having sufficient transparency for visual observation therethrough of the growth of bacteria in said medium and indicia on said bottom identifying each of said zones with the corresponding agent on the registering one of said supports.

6. In apparatus for testing the effect of different metabolic agents on bacterial organisms, the combination of, an open top dish member adapted to contain a quantity of nutrient culture medium covering a generally flat bottom of the dish with the upper surface of the medium exposed, a cover member for said dish member adapted to interfit with the latter and overlie said medium surface, said cover having supporting means projecting into said dish and toward said exposed surface of said medium when the cover and the dish interfit with each other, a plurality of quantities of different metabolic agents in a solid state spaced apart on the underside of said cover member in a predetermined pattern and fastened to said supporting means for movement with the cover relative to said dish, said supporting means positioning said agents in contact with said upper medium surface when said cover member interfits with said dish member and overlies said surface, and means on one of said members defining a plurality of sets of zones of effectiveness arranged in a predetermined pattern complementary to said agent pattern and each having a center registering with each of said agents when said cover and dish members interfit, said one member having sufficient transparency to permit visual observation therethrough of the growth of bacteria on said upper surface of said medium.

7. In apparatus for testing the effect of metabolic agents on bacterial organisms, the combination of, a dish, a quantity of nutrient culture medium in the form of a layer covering the bottom of the dish and having an exposed upper surface, a cover for said dish adapted to interfit with the latter and to overlie said medium surface, said cover having supporting means projecting into said dish and toward said exposed surface of said medium when the cover and the dish interfit with each other, and a plurality of quantities of metabolic agents in a solid state spaced apart on the underside of said cover and fastened to said supporting means for movement with the cover relative to said dish, said supporting means positioning said agents in contact with said medium surface when the cover interfits with said dish and overlies the medium.

8. In apparatus for testing the effect of metabolic agents on bacterial organisms, the combination of, a dish adapted to contain a quantity of nutrient culture medium in the form of a layer covering the bottom of the dish and having an exposed upper surface, a cover for said dish adapted to interfit with the latter and to overlie said medium surface, said cover having supporting means projecting into said dish and toward said exposed surface of said medium when the cover and the dish interfit with each other, locating parts on said cover and said dish interfitting with each other in only one position of assembly of the cover on the dish and positioned to block assembly of the cover in any other position on the dish, a plurality of quantities of metabolic agents in a solid state spaced apart on the underside of said cover and fastened to said supporting means for movement with the cover relative to said dish, said supporting means positioning said agents in contact with said medium surface when the cover interfits with said dish and overlies the medium.

References Cited in the file of this patent

UNITED STATES PATENTS

| | | |
|---|---|---|
| 2,533,089 | Brewer et al. | Dec. 5, 1950 |
| 2,672,432 | Goetz | Mar. 16, 1954 |
| 2,677,646 | Lovell et al. | May 4, 1954 |

OTHER REFERENCES

"Jour. of Bacteriology," vol. 49, No. 1, January 1945, page 101 to 104.

Schaar and Co., "Selected Laboratory Equipment," Catalog No. 50 (New York), 1950, page 198.